United States Patent
Scherping et al.

(10) Patent No.: US 9,959,751 B2
(45) Date of Patent: May 1, 2018

(54) FILTER METHOD FOR ADAPTING A COMPUTING LOAD

(71) Applicant: Continental Teves AG & Co. oHG, Frankfurt (DE)

(72) Inventors: Richard Scherping, Liederbach am Taunus (DE); Ulrich Stählin, Eschborn (DE); Marc Menzel, Weimar (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 86 days.

(21) Appl. No.: 14/912,193

(22) PCT Filed: Jul. 15, 2014

(86) PCT No.: PCT/EP2014/065175
§ 371 (c)(1),
(2) Date: Feb. 16, 2016

(87) PCT Pub. No.: WO2015/028194
PCT Pub. Date: Mar. 5, 2015

(65) Prior Publication Data
US 2016/0203711 A1 Jul. 14, 2016

(30) Foreign Application Priority Data

Aug. 26, 2013 (DE) .......................... 10 2013 216 962

(51) Int. Cl.
*G08G 1/01* (2006.01)
*H04L 12/931* (2013.01)
(Continued)

(52) U.S. Cl.
CPC ......... *G08G 1/0104* (2013.01); *G08G 1/0129* (2013.01); *H04L 49/506* (2013.01);
(Continued)

(58) Field of Classification Search
CPC .... H04W 4/046; H04W 4/027; G08G 1/0104; G08G 1/0129; H04L 49/506; H04L 63/0227
See application file for complete search history.

(56) References Cited

U.S. PATENT DOCUMENTS 6,438,551 B1 8/2002 Holmskar
2007/0280114 A1 12/2007 Chao
(Continued)

FOREIGN PATENT DOCUMENTS

DE 19755129 6/1999
DE 102007053255 9/2009
(Continued)

OTHER PUBLICATIONS

German Search Report for German Application No. 10 2014 213 771.3 dated Nov. 17, 2014, including partial translation.
(Continued)

*Primary Examiner* — Jeffrey M Rutkowski
*Assistant Examiner* — Mandish Randhawa
(74) *Attorney, Agent, or Firm* — RatnerPrestia

(57) ABSTRACT

A filter method for adapting a computing load to a computing capacity of a car-to-x communication system, in which method car-to-x messages are received and/or sent using the car-to-x communication system and the received car-to-x messages require processing by the car-to-x communication system. The filter method decides which of the received car-to-x messages to process and which of the received car-to-x messages to discard.

15 Claims, 2 Drawing Sheets

(51) Int. Cl.
*H04W 4/02* (2018.01)
*H04W 4/04* (2009.01)
*H04L 29/06* (2006.01)

(52) U.S. Cl.
CPC ........... *H04W 4/027* (2013.01); *H04W 4/046* (2013.01); *H04L 63/0227* (2013.01)

(56) References Cited

U.S. PATENT DOCUMENTS

| | | |
|---|---|---|
| 2009/0133121 A1 | 5/2009 | Falk |
| 2010/0049976 A1 | 2/2010 | Karnik |
| 2011/0080302 A1 | 4/2011 | Muthaiah |
| 2011/0140968 A1 | 6/2011 | Bai |
| 2012/0084440 A1 | 4/2012 | Stahlin |
| 2013/0035051 A1* | 2/2013 | Mujtaba ............... H04B 7/0808 455/277.2 |
| 2013/0083679 A1 | 4/2013 | Krishnaswamy |
| 2013/0188489 A1 | 7/2013 | Sato |
| 2014/0020098 A1 | 1/2014 | Stahlin |
| 2015/0081903 A1* | 3/2015 | Molinero Fernandez ............ H04M 15/66 709/225 |

FOREIGN PATENT DOCUMENTS

| | | |
|---|---|---|
| DE | 102009037864 | 6/2010 |
| DE | 102010002883 | 10/2010 |
| DE | 102010046843 | 6/2011 |
| DE | 102012204880 | 10/2012 |
| EP | 2288190 | 2/2011 |

OTHER PUBLICATIONS

International Search Report for International Application No. PCT/EP2014/065175 dated Sep. 10, 2014.
Written Opinion of the International Searching Authority for International Application No. PCT/EP2014/065175 dated Sep. 10, 2014.

* cited by examiner

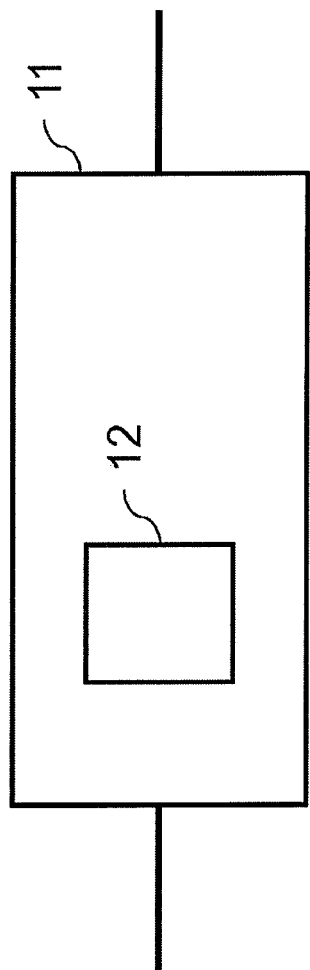

FILTER METHOD FOR ADAPTING A COMPUTING LOAD

CROSS REFERENCE TO RELATED APPLICATIONS

This application is the U.S. National Phase Application of PCT International Application No. PCT/EP2014/065175, filed Jul. 15, 2014, which claims priority to German Patent Application No. 10 2013 216 962.0, filed Aug. 26, 2013, the contents of such applications being incorporated by reference herein.

FIELD OF THE INVENTION

The invention relates to a filter method for adjusting a computing load.

BACKGROUND OF THE INVENTION

"Vehicle-to-X communication systems", which are designed to transmit both traffic-related data and a range of service data such as entertainment applications, for instance, are known in the prior art. Vehicle-to-X communication in such systems is based both on data transfer amongst vehicles (vehicle-to-vehicle communication) and on data transfer between vehicles and infrastructure equipment (vehicle-to-infrastructure communication).

The high level of reliability and data integrity required of information transmitted by vehicle-to-X communication means that such information must additionally be provided with a complex security signature and/or data encryption. Analyzing such a security signature or decoding such data encryption, however, is associated with a relatively high level of computing effort. Moreover, particular situations arise, for instance passing a heavily used town-center junction at rush hour, in which such a large number of vehicle-to-X messages are received that processing all the received vehicle-to-X messages likewise is only possible by providing a relatively large amount of computing power.

With traditional surround sensors, the amount of data to be processed is set by the design of the transducer, and the hardware and software for the processing steps can be adjusted accordingly to this largely constant amount of incoming data, whereas in contrast, in a vehicle-to-X communication system, the amount of data depends on a multiplicity of factors such as the proportion of other vehicles and infrastructure equipped with the technology, the vehicle density etc., and ranges from zero messages per second (travelling along a lonely country road) to the theoretical physical maximum of potentially several thousand messages per second (approx. 1000 with regard to a currently envisaged channel, ITS-G5 CCH at 6 Mbit/s gross).

Therefore hardware and software of a vehicle-to-X communication system must be designed for a reasonable amount of data. Currently such figures are calculated from supposedly realistic scenarios, e.g. 400 messages per second. The behavior of the system for greater amounts of data is undefined, however.

SUMMARY OF THE INVENTION

An aspect of the invention proposes a method that is an improvement on the prior art.

Various preprocessing techniques can be used to eliminate messages, which techniques select from among all the received vehicle-to-X messages the vehicle-to-X messages to be processed, and eliminate some of the received vehicle-to-X messages.

It is also possible to provide other degrees of refinement apart from complete processing and/or elimination, for instance processing without/with checking a signature, handling only in a network and/or transport layer, and/or no handling in certain equipment or facilities. This allows a fine degree of adjustment to, and/or reduction in, the computing time.

According to a first aspect, the invention relates to a filter method for adjusting a computing load to a computing capacity of a vehicle-to-X communication system, wherein the vehicle-to-X communication system is used to receive and/or send vehicle-to-X messages, and wherein the received vehicle-to-X messages require processing by the vehicle-to-X communication system, and wherein the filter method decides which of the received vehicle-to-X messages are processed and which of the received vehicle-to-X messages are discarded. This achieves the advantage that the number of vehicle-to-X messages to be processed can be limited. The computing load is thereby adjusted to the computing capacity of the vehicle-to-X communication system.

According to one embodiment, the filter method filters by the parameters receive field strength, type of vehicle-to-X message, data rate, data volume, time length, data encoding, sender position, packet rate and/or time-to-collision. This achieves the advantage that the filter method can be implemented efficiently.

According to one embodiment, the filter method filters by the parameters according to the situation. This achieves the advantage that the vehicle-to-X messages can be filtered according to internal or external circumstances of the vehicle and/or of the vehicle-to-X communication system.

According to one embodiment, the filter method takes into account the following variables in order to filter or adjust the parameters according to the situation:
- processor load;
- number of received data packets;
- speed of a receiver vehicle;
- geographical data, e.g. from digital maps;
- location information associated with learned amounts of data at this location; and/or
- information from surround sensors, from which the amount of data to be expected can be deduced.

This achieves the advantage that the situation-dependent filtering or adjustment can be performed efficiently.

According to one embodiment, the filter method has two stages. This achieves the advantage that two different dynamic responses can be used in the filtering.

In this case, the parameters of the filter method can be adjusted in two stages. The filtering itself may be a multi-stage filtering process.

According to one embodiment, a first stage of the filter method monitors the variables or parameters over a relatively long time period and statistically analyzes the variables or parameters over said relatively long time period. This achieves the advantage that relatively slow changes in the variables or parameters can be detected.

According to one embodiment, a second stage of the filter method monitors the variables or parameters over a relatively short time period and statistically analyzes the variables or parameters over said relatively short time period. This achieves the advantage that relatively fast changes in the variables or parameters can be detected.

According to one embodiment, the first stage adjusts the parameters over the long term. This achieves the advantage that the filtering parameters can be adjusted over a long time period.

According to one embodiment, the second stage adjusts the parameters over the short term. This achieves the advantage that the filtering parameters can be adjusted over a short time period.

According to one embodiment, the second stage of the filter method adds a second adjustment to a first adjustment of the first stage, or combines the second adjustment with the first adjustment, or replaces the first adjustment with the second adjustment. This achieves the advantage that the parameters can be adjusted both in the long term and in the short term.

According to one embodiment, the second stage of the filter method replaces the adjustment of the first stage with the adjustments of the second stage. The first adjustments are resumed at the end of the second adjustment. This method allows a simpler implementation because fewer interactions between the two adjustment stages are checked.

According to one embodiment, the filter method comprises determining a change over time in a number of received vehicle-to-X messages, wherein the second stage of the filter method adds the second adjustment to the first adjustment of the first stage or combines the second adjustment with the first adjustment if the determined change over time exceeds a predetermined threshold value. This achieves the advantage that if the predetermined threshold value is exceeded, the parameters can be adjusted more quickly for example.

According to one embodiment, the received vehicle-to-X messages comprise a priority indicator, and the filter method decides on the basis of the priority indicator, which of the received vehicle-to-X messages are processed and which of the received vehicle-to-X messages are discarded. This achieves the advantage that filtering of the vehicle-to-X messages can be performed efficiently. The "traffic class" specified in the ETSI ITS-G5 standard can be used, for example, as the priority indicator.

According to one embodiment, the filter method limits a number of vehicle-to-X messages to be processed within a predetermined time period to a predetermined number. This achieves the advantage that the computing load can be adjusted efficiently to the computing capacity of the vehicle-to-X communication system.

According to a second aspect, the invention relates to a filter device for adjusting a computing load to a computing capacity of a vehicle-to-X communication system, wherein the vehicle-to-X communication system is used to receive and/or send vehicle-to-X messages, and wherein the received vehicle-to-X messages require processing by the vehicle-to-X communication system, and wherein the filter device decides which of the received vehicle-to-X messages are processed and which of the received vehicle-to-X messages are discarded. This achieves the advantage that the number of vehicle-to-X messages to be processed can be limited. The computing load is thereby adjusted to the computing capacity of the vehicle-to-X communication system.

The filter method can be carried out by the filter device. Other features of the filter device are apparent directly from the functions of the filter method. The filter device may be part of the vehicle-to-X communication system and/or may be integrated in the vehicle-to-X communication system.

According to a third aspect, the invention relates to a computer program containing a program code, wherein the computer program is designed to execute the filter method on a computer. This achieves the advantage that the filter method can be automated and executed repeatedly.

The vehicle-to-X communication system and/or the filter device can be programmed to run the computer program.

The invention can be implemented in hardware and/or software.

Early filtering of the data (for example between access technologies and network & transport, i.e. between the message-receiving data layer and the network & transport layer) can be used to ensure that the amount of data does not exceed a specified value. Degradation (i.e. the loss of some vehicle-to-X messages) occurs in this case in a defined and configurable manner because filtering is performed on the basis of specifiable criteria.

These criteria are based on properties of a vehicle-to-X message and/or of a data packet that can be checked using relatively little computing effort, for example:

receive field strength;
packet type, content type, content subtype (i.e. the type of vehicle-to-X message, content type of the vehicle-to-X message, content subtype of the vehicle-to-X message);
data rate;
data volume;
time length;
data encoding; and/or
sender position relative to a rectangular area about the actual vehicle.

The remaining vehicle-to-X messages or data packets can then be filtered further using more complex techniques, for example:

data packet rate (also known as "inbound rate control"); and/or
TTC (time-to-collision, i.e. time until colliding with a sender of the vehicle-to-X message).

In addition, the filtering can be performed on the basis of a priority indicator, which can be embedded in the vehicle-to-X messages or data packets. The "traffic class" specified in the ETSI ITS-G5 standard can be used, for example, as the priority indicator.

A vehicle-to-X message usually comprises a plurality of data packets, which may also have different content. The content of a vehicle-to-X message or of a data packet is in this case the data content, i.e. the information described by the data. The vehicle-to-X message may be, for example, a Cooperative Awareness Message (CAM) or a Decentralized Environmental Notification Message (DENM) as specified in the ETSI ITS-G5 standard.

The filtering preferably provides a "fallback" or failsafe mechanism for the overload situation, which allows continued operation of the system even in the overload situation. Furthermore this also makes it possible to respond expediently to deliberate attacks (e.g. "denial of service") and to faulty senders (e.g. "babbling idiot").

The filtering can preferably be designed here such that filtering is performed using constant parameters in each case, so for instance vehicle-to-X messages of a certain packet type are always discarded, or only vehicle-to-X messages within a certain distance are forwarded to the relevant vehicle applications.

More preferably still is an adaptive adjustment of the filter parameters, so that the number of forwarded data packets remains constant. This can be achieved, for example, by constantly monitoring how many vehicle-to-X messages or data packets arrive. As soon as this number approaches the maximum number of vehicle-to-X messages or data packets that can be processed, the filter parameters are modified in such a way that more and more vehicle-to-X messages or data packets are discarded. If the number of received vehicle-to-X messages or data packets falls again, then the filters are "widened" again. A multiplicity of applicable algorithms known per se and having various advantages and disadvantages can be used for this procedure.

In order to be able to process even a sudden rise in vehicle-to-X messages or data packets, it is advantageously provided to perform the parameter adjustment using two different dynamic responses. A first, slow adjustment ensures continuous adjustment to the prevailing situation as an average. A second, fast adjustment (comparable to a non-return valve) ensures that for very rapid changes in the number of vehicle-to-X messages or data packets, the parameters are adjusted at a correspondingly rapid rate. These second adjustments, however, are also withdrawn again relatively quickly. Methods that manage without a large amount of computing power (e.g. from the list given above) are preferably used for the fast adjustment. Most preferably, the second, fast adjustment is triggered by the change exceeding a threshold value, in order to avoid over-frenetic adjustments.

The following variables are preferably provided as the open-loop/closed-loop control variable or adaption variable for the dynamic adjustment:
  processor load;
  number of received vehicle-to-X messages or data packets;
  speed (faster changes can be expected at a higher speed than at a lower speed);
  geographical data, e.g. from digital maps (it can be deduced therefrom whether or not to expect large amounts of data in a region);
  location information associated with learned amounts of data at this location; and/or
  information from surround sensors, from which the amount of data to be expected can be deduced, for instance information such as the current maximum range of a radar or the number of objects identified in the surroundings.

In particular, said variables or parameters are in each case preferably detected or adjusted per defined unit of time. The relevant values for these variables or parameters are determined over a short time period for the second, fast adjustment and over a longer time period for the first, slower adjustment.

An aspect of the invention hence results in the advantage that the entire "communication stack" can be designed on the basis of a largely predictable maximum computing load yet can still work in an orderly manner in overload situations. The filter layer performing the filtering can be expanded into a preprocessing stage relatively easily using the techniques known from the prior art, which preprocessing performs a classification and a plausibility check. The classification, for example, can classify a received vehicle-to-X message and/or a received data packet as critical, relevant or irrelevant for subsequent processing. The plausibility check, for example, can check a received vehicle-to-X message and/or a received data packet against a plurality of filter parameters for plausibility or consistency.

BRIEF DESCRIPTION OF THE DRAWINGS

Further preferred embodiments are given in the dependent claims and the following description of exemplary embodiments with reference to figures, in which:

FIG. 2 shows an example of a vehicle-to-X communication system comprising a filter device.

DETAILED DESCRIPTION OF THE PREFERRED EMBODIMENTS

Figure 1:
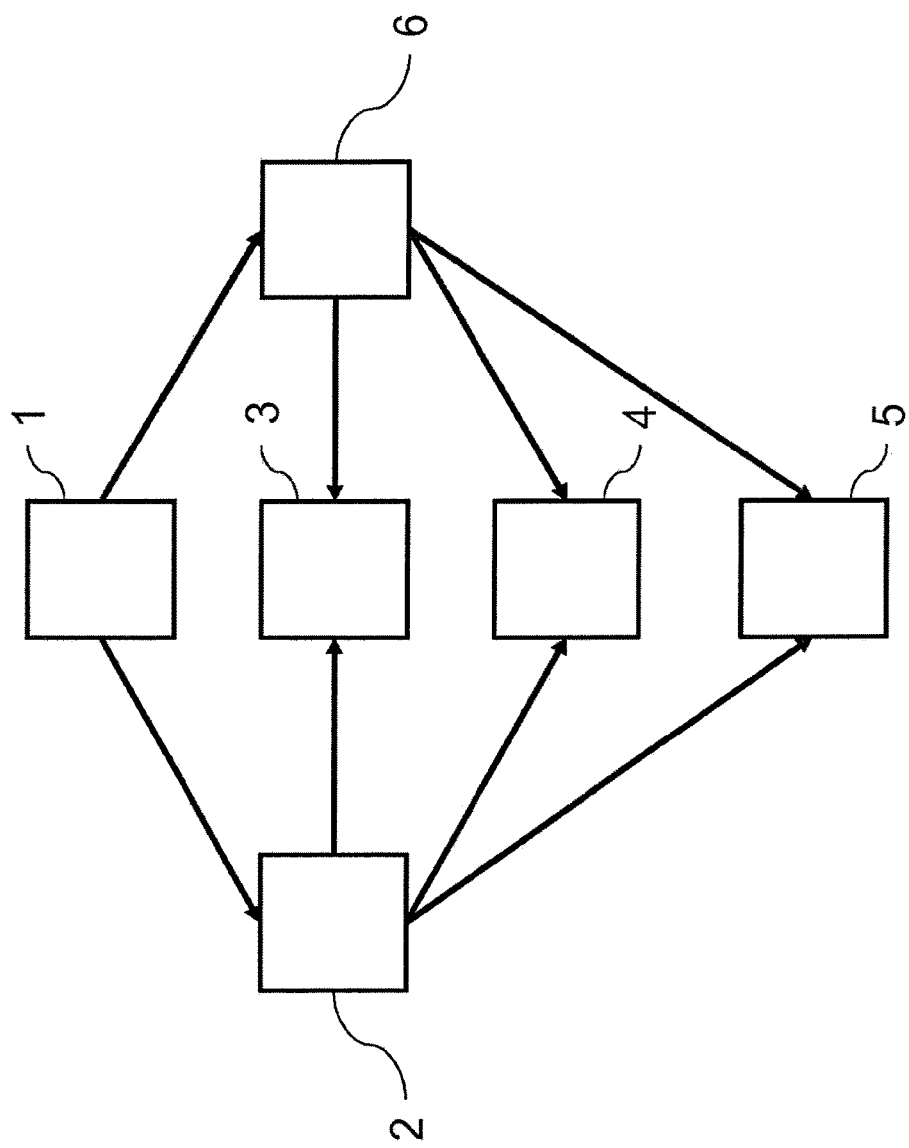
FIG. 1 is a flow diagram showing an example of a possible sequence of a filter method.

FIG. 1 shows by way of example a possible sequence of a filter method in the form of a flow diagram.

In method step 1, in time units of 0.5 s, the current actual status of the processor load or computing load of the vehicle-to-X communication system is determined, the number of received vehicle-to-X messages is determined, the speed of the receiver vehicle is determined, the geographical data is determined from a digital map, location information in association with a learned number of received vehicle-to-X messages at this location is retrieved from a digital memory, and/or information from vehicle surround sensors is analyzed, which information can be used to deduce the number of vehicle-to-X messages expected to be received at the current location.

In step 2, a first and comparatively slow adjustment of the parameters of a message-filter method is performed, which keeps the number of received vehicle-to-X messages to be processed within a range that on average does not exceed the available computing capacity. The time period monitored by the first adaptation and over which averaging is performed in this case equals 2 h. It should be mentioned that this time period may also be considerably longer or shorter, for instance from 5 min up to 12 h.

According to one embodiment, a mean value of 5 minutes is used, which can be adjusted, for instance, down to 1 minute and up to 1 h.

In the subsequent step 3, a threshold value for the receive field strength is adjusted, below which field strength, received vehicle-to-X messages are discarded without further processing.

In step 4, the type of vehicle-to-X messages that are discarded without further processing is redefined. In this case, when there is a high load, increasingly important types of message are discarded. This step nevertheless ensures that vehicle-to-X messages identified as relevant are always processed.

In step 5, the size of a rectangle placed around the receive vehicle is adjusted, which rectangle encloses coordinates, where vehicle-to-X messages sent from said coordinates are processed. Vehicle-to-X messages coming from senders outside the rectangle, on the other hand, are discarded without further processing.

In method step 6, a second, relatively fast adjustment is performed simultaneously with the first adjustment in step 2. Unlike the first adjustment, the second adjustment monitors only a time period of 2 s, and based on the values from step 1 monitored in this time period performs an adjustment in steps 3, 4 and 5, in a similar way to the first adjustment. The second adjustment is thus considerably more rapid than the first adjustment and adds its presets or adjustments to the presets or adjustments of the first adjustment. According to one embodiment, the second adjustment is combined with the first adjustment. According to one embodiment, the first adjustment or alternatively the second adjustment is performed.

FIG. 2 shows by way of example a vehicle-to-X communication system 11 having a filter device 12. The filter device 12 is provided for adjusting a computing load to a computing capacity of the vehicle-to-X communication system 11.

The vehicle-to-X communication system 11 can be used to receive and/or send vehicle-to-X messages, wherein the received vehicle-to-X messages require processing by the vehicle-to-X communication system 11. The filter device 12 decides which of the received vehicle-to-X messages are processed and which of the received vehicle-to-X messages are discarded.

The filter device 12 may be part of the vehicle-to-X communication system 11 and/or may be integrated in the vehicle-to-X communication system 11.

The invention relates to a filter method for adjusting a computing load to a computing capacity of a vehicle-to-X communication system, wherein the vehicle-to-X communication system is used to receive and/or send vehicle-to-X messages, wherein the received vehicle-to-X messages require processing by the vehicle-to-X communication system, and wherein the filter method decides which of the received vehicle-to-X messages are processed and which of the received vehicle-to-X messages are discarded.

According to one embodiment, the filter method filters by the parameters receive field strength, type of vehicle-to-X message, sender position, packet rate and/or time-to-collision.

According to one embodiment, the filter method filters by the parameters according to the situation.

According to one embodiment, the filter method takes into account the following variables in order to adjust the parameters according to the situation:
processor load;
number of received data packet;
speed of a receiver vehicle (faster changes can be expected at a higher speed than at a lower speed);
geographical data, e.g. from digital maps (it can be deduced therefrom whether or not to expect large amounts of data in a region);
location information associated with learned amounts of data at this location; and
information from surround sensors, from which the amount of data to be expected can be deduced, for instance information such as the current maximum range of a radar or the number of objects identified in the surroundings.

According to one embodiment, the filter method has two stages.

According to one embodiment, a first stage of the filter method monitors the parameters over a relatively long time period and statistically analyzes the parameters over said relatively long time period.

According to one embodiment, a second stage of the filter method monitors the parameters over a relatively short time period and statistically analyzes the parameters over said relatively short time period.

According to one embodiment, the first stage adjusts the parameters over the long term.

According to one embodiment, the second stage adjusts the parameters over the short term.

According to one embodiment, the second stage of the filter method adds a second adjustment to a first adjustment of the first stage.

According to one embodiment, a second stage of the filter method replaces a first adjustment of the first stage with a second adjustment.

The invention claimed is:

1. A filter method for adjusting a computing load to a computing capacity of a vehicle-to-X communication system, the method comprising:
receiving and/or sending, by the vehicle-to-X communication system, vehicle-to-X messages, wherein the received vehicle-to-X messages require processing by the vehicle-to-X communication system; and
deciding, by the filter method, which of the received vehicle-to-X messages are processed and which of the received vehicle-to-X messages are discarded based on parameters of the vehicle-to-X communication system, the filter method having:
a first stage adjusting the parameters at a first adjustment rate to produce a first adjustment of the parameters, and
a second stage adjusting the parameters at a second adjustment rate greater than the first adjustment rate to produce a second adjustment of the parameters,
wherein the filter method filters the messages by: 1) alternatively using the first adjustment or the second adjustment, 2) adding the second adjustment to the first adjustment, or 3) combining the second adjustment with the first adjustment.

2. The filter method as claimed in claim 1, wherein the filter method filters by the parameters receive field strength, type of vehicle-to-X message, data rate, data volume, time length, data encoding, sender position, packet rate and/or time-to-collision.

3. The filter method as claimed in claim 2, wherein the filter method filters by the parameters according to the situation.

4. The filter method as claimed in claim 3, wherein the filter method takes into account the following variables in order to filter or adjust the parameters according to the situation:
processor load;
number of received data packets;
speed of a receiver vehicle;
geographical data;
location information associated with learned amounts of data at this location; and/or
information from surround sensors, from which the amount of data to be expected can be deduced.

5. The filter method as claimed in claim 4, wherein the filter method has two stages.

6. The filter method as claimed in claim 5, wherein a first stage of the filter method monitors the variables over a relatively long time period and statistically analyzes same over said relatively long time period.

7. The filter method as claimed in claim 5, wherein a second stage of the filter method monitors the variables over a relatively short time period and statistically analyzes same over said relatively short time period.

8. The filter method as claimed in claim 6, wherein the first stage adjusts the parameters over the long term.

9. The filter method as claimed in claim 7, wherein the second stage adjusts the parameters over the short term.

10. The filter method as claimed in claim 5, wherein the filter method comprises determining a change over time in a number of received vehicle-to-X messages, and wherein the second stage of the filter method adds the second adjustment to the first adjustment of the first stage or combines the second adjustment with the first adjustment if the determined change over time exceeds a predetermined threshold value.

11. The filter method as claimed in claim 1, wherein the received vehicle-to-X messages comprise a priority indicator, and the filter method decides on the basis of the priority indicator, which of the received vehicle-to-X messages are processed and which of the received vehicle-to-X messages are discarded.

12. The filter method as claimed in claim 1, wherein the filter method limits a number of vehicle-to-X messages to be processed within a predetermined time period to a predetermined number.

13. A system including:
   a vehicle-to-X communication system for receiving and/or sending vehicle-to-X messages, wherein the received vehicle-to-X messages require processing by the vehicle-to-X communication system; and
   a filter device for adjusting a computing load to a computing capacity of the vehicle-to-X communication system, wherein the filter device decides which of the received vehicle-to-X messages are processed and which of the received vehicle-to-X messages are discarded based on parameters of the vehicle-to-X communication system, the filter device configured to:
   adjust, in a first stage, the parameters at a first adjustment rate to produce a first adjustment of the parameters, and
   adjust, in a second stage, the parameters at a second adjustment rate greater than the first adjustment rate to produce a second adjustment of the parameters,
   wherein the filter device filters the messages by: 1) alternatively using the first adjustment or the second adjustment, 2) adding the second adjustment to the first adjustment, or 3) combining the second adjustment with the first adjustment.

14. A non-transitory computer readable medium comprising computer program code which when executed on a computer implements the filter method as claimed in claim 1.

15. The filter method as claimed in claim 6, wherein a second stage of the filter method monitors the variables or parameters over a relatively short time period and statistically analyzes same over said relatively short time period.

* * * * *